United States Patent
Schicht et al.

[11] Patent Number: 6,159,621
[45] Date of Patent: Dec. 12, 2000

[54] GLASS SUBSTRATE PROVIDED WITH A THIN-FILM STACK HAVING REFLECTIVE PROPERTIES IN THE INFRARED AND/OR IN THE REGION OF SOLAR RADIATION

[75] Inventors: Heinz Schicht, Bethau; Uwe Schmidt, Falkenberg/Elster; Wilfried Kaiser; Bodo Hryniw, both of Torgau, all of Germany

[73] Assignee: Saint-Gobain Vitrage, Courbevoie, France

[21] Appl. No.: 09/126,931

[22] Filed: Jul. 31, 1998

[30] Foreign Application Priority Data

Jul. 31, 1997 [DE] Germany .......................... 197 32 978

[51] Int. Cl.[7] ........................................... B32B 15/04
[52] U.S. Cl. ......................... 428/633; 359/359; 359/585; 428/469; 428/472; 428/432; 428/433; 428/434; 428/697; 428/699; 428/701; 428/702; 428/336; 428/621; 428/623; 428/632
[58] Field of Search .................................... 428/336, 472, 428/469, 432, 697, 699, 701, 702, 433, 434, 621, 623, 632, 633; 359/359, 585

[56] References Cited

U.S. PATENT DOCUMENTS 5,110,637  5/1992  Ando et al. .............................. 428/432
5,532,062  7/1996  Miyazaki et al. ........................ 428/697
5,543,229  8/1996  Ohsaki et al. ........................... 428/472

FOREIGN PATENT DOCUMENTS 0 304 234 A2  2/1989  European Pat. Off. .
0 464 789 A1  1/1992  European Pat. Off. .
0 593 883 B1  12/1995  European Pat. Off. .
216 839  12/1981  Germany .
288 822 A5  10/1983  Germany .
2 112 815  12/1982  United Kingdom .

*Primary Examiner*—Archene Turner
*Attorney, Agent, or Firm*—Pennie & Edmonds LLP

[57] ABSTRACT

The invention concerns a transparent substrate provided with a thin-film stack comprising at least one metallic film with reflective properties in the infrared, under which is disposed a first antireflection coating consisting essentially of one or more metal oxides, and an upper protective metallic film characterized in that the protective metallic film consists of an alloy of Ti, Zr or Hf with Al, Pt or Pd or an AlSi alloy.

According to the invention, the second upper antireflection coating includes at least two metal oxide films, one of which is ZnO based and contains 0.1 to 10% by weight of at least one of the elements B, Si, Ga, Sm, Al, Co, Mg, Mn, Fe, Ni and/or Cr and the other is $SnO_2$ or $Bi_2O_3$ based, and a final, hard oxide based film.

16 Claims, No Drawings

GLASS SUBSTRATE PROVIDED WITH A THIN-FILM STACK HAVING REFLECTIVE PROPERTIES IN THE INFRARED AND/OR IN THE REGION OF SOLAR RADIATION

BACKGROUND OF THE INVENTION

The instant invention concerns a transparent substrate provided with a thin-film stack comprising at least one metallic film with reflective properties in the infrared, under which is disposed a first antireflection coating consisting essentially of one or more metal oxides, and an upper protective metallic film surmounted in turn by a second upper antireflection coating.

It is known that substrates provided with a film stack comprising silver as a functional layer can be relatively sensitive to chemical stresses. To protect the silver film against attack by oxygen, the silver films are therefore generally protected by a metallic protective film which is applied over the silver film and has a greater affinity for oxygen. In addition, the subsequent antireflection coating is of essential importance to the chemical resistance and mechanical strength of the stack of films. Various multilayer film structures have been proposed for the antireflection coating in order to improve the chemical resistance and the mechanical strength of such stacks.

A film stack of this type, possessing high mechanical strength and high chemical resistance, is known from Document EP 0 593 883 B1. In this known film stack, a coating comprising three nonmetallic films is applied over the metallic protective film and, in this coating, the nonmetallic film adjacent the metallic protective film contains the metal of this metallic protective film, not as an essential constituent of its chemical composition. In the case concerned, the nonmetallic coating preferably consists of alternating zinc oxide and titanium oxide films applied by the reactive cathode sputtering process. It is assumed in this case that a zinc titanate film in the subnanometer range forms at each interface, thereby reinforcing the protective effect of the metallic protective film. In the case under consideration, a final, nonmetallic film, consisting in particular of titanium oxide, is preferably applied on top of the nonmetallic coating.

Such a film stack that includes titanium oxide films is relatively costly to manufacture, since such films can be produced only at a relatively low sputtering rate. Moreover, to apply a total of four extra films over the metallic protective film in a continuous-feed coating installation, it is necessary to have at least four extra sputtering stations, which are not always present in existing coating plants.

SUMMARY OF THE INVENTION

The purpose of the invention is to propose a substrate provided with a thin-film stack of the aforesaid type which is easier to manufacture, in particular without thereby adversely affecting its physical strength and chemical resistance.

The substrate according to the invention is characterized in that the metallic protective film consists of an alloy of Ti, Zr or Hf with Al, Pd or Pt or of an AlSi alloy and in that the second upper antireflection coating includes at least two metal oxide films, one of which is ZnO based and contains 0.1 to 10% by weight of at least one of the elements B, Si, Ga, Sn, Al, Co, Mg, Mn, Fe, Ni and/or Cr and the other is $SnO_2$ or $Bi_2O_3$ based, and a second, hard oxide based film.

DETAILED DESCRIPTION OF THE INVENTION

The structure according to the invention of the upper coating yields a stack that possesses a high, surprisingly good chemical resistance. In addition, the metal targets and alloys used in the fabrication of this stack all cost little to produce and are susceptible to ready sputtering at high sputtering rates.

The high chemical stability of the film stack according to the invention can probably be explained by the fact that the special film materials of the metallic protective film and of the metallic oxide films are selected on the basis of their respective kinetic and thermodynamic properties, so that intermediate thin films of mixed oxide with a spinel structure form at each of the interfaces, the spinel structure being known to be the cubic arrangement with the highest sphere density, which it is very difficult for ions entering by diffusion to penetrate, and which therefore constitutes a particularly effective barrier layer.

Furthermore, it seems to be of essential importance that during the sputtering process, the film materials selected according to the invention are wetted optimally at their interfaces, that is, in a particularly regular and dense manner, in other words, that they propagate as coherent films without forming islands and that they adhere well to one another. One essential factor in this case is apparently the fact that various partial ionic bonds of the mutually adjacent oxides are of the same order of magnitude as those of the materials of the films according to the invention. Obviously, the wettability is optimal when the difference between the partial ionic bonds of the various oxides is very small, or, in the ideal case, is zero. Further, when particularly favorable thermodynamic conditions exist as well, as is the case in the structure according to the invention, the desired dense, spinel-structured barrier layers form especially readily.

Moreover, this effect important to the success of the invention is obviously further reinforced by the fact that the oxide matrix per se contains dopants which further can form mixed spinel oxides at the phase limits inside the films, such as, for example, spinels of the types $ZnAl_2O_4$, $Zn_2TiO_4$, $TiZn_2O_4$, $Zn_2SnO_4$, $SnZn_2O_4$, $Co_2SnO_4$, $SnCo_2O_4$, $TiFe_2O_4$, $CoAl_2O_4$, $FeAl_2O_4$ and/or $MnAl_2O_4$.

As has already been described in Document DD 216 839, titanium has a high reactive ability to form intermetallic or mixed phases at the interfaces, which has been observed at the Al/Ti interface.

In an advantageous embodiment of the invention, the metal oxide film adjacent the metallic protective film is $SnO_2$ based and the other metal oxide film consists essentially of zinc oxide doped with Al and Si. In this case, the doped zinc oxide is preferably deposited by reactive sputtering from a metal target composed of zinc alloyed with 0.3 to 10% by weight Al and 0.01 to 1% by weight Si.

$TiO_2$ and $Al_2O_3$ based films, and in particular $ZrO_2$ or $SiO_2$ based films, have proven particularly useful as the final film in the film stack according to the invention, while the metallic protective film consists in particular of TiPd, which is formed by sputtering from a target composed of titanium alloyed with 0.1 to 0.3% by weight Pd.

The invention is illustrated hereinbelow by means of a comparative example and an example according to the invention.

COMPARATIVE EXAMPLE

A film stack with the structure described in Document EP 0 593 883 B1 was prepared as a comparative example. This layer structure was also developed with a view toward high mechanical resistance to ambient conditions and to scratching, and is intended to prevent, even over the long term, any chemical alteration of the silver film and the metallic protective film applied thereon.

The film stack, which was applied to float glass by the reactive sputtering process, had the following sequence:

Glass-$SnO_2$—ZnO—Ag—Ti—ZnO—$SnO_2$—ZnO—$TiO_2$

Table 1 below gives the thicknesses, in nm, of the corresponding films:

TABLE 1

| Glass | Thickness (nm) |
| --- | --- |
| $SnO_2$ | 20 |
| ZnO | 17 |
| Ag | 11 |
| Ti | 3 |
| ZnO | 10 |
| $SnO_2$ | 17 |
| ZnO | 10 |
| $TiO_2$ | 3 |

Specimens provided with this film stack were subjected to the following tests:

A) Test known as "Plattenmethode nack Kimmel et al.", Z. Glastechnische Berichte 59 (1986), pp. 252 et seq. The Ag* lixiviation behavior of the film is determined by this method;

B) Water of condensation test, according to which the test pieces are exposed to a temperature of 60° C. at a relative humidity of 100%;

C) Washing test according to ASTMD 2486;

D) Climatic variations test according to DIN 52344;

E) Salt spray test according to DIN 50021; and

F) Hydrochloric acid test, according to which the glass test piece is immersed for 8 min. in 0.01 N HCl at 38° C. and the loss of emittivity is determined as a percentage.

When performed on this comparison film stack, the tests yielded the following data, representing the time for each of tests B, D and E, and for test C the number of passes after which the first visible defects appeared in the film.

| Test | A | B | C | D | E | F |
| --- | --- | --- | --- | --- | --- | --- |
| Result | 0.08 mg/l | 192 h | 1000 passes | 15 h | 24 h | 20% |

Overall, the test results show that a high degree of mechanical strength and chemical resistance is attained with this film stack. However, the loss of emissivity determined by the hydrochloric acid test, as well as the climatic variations test and the results obtained by the plate method (according to Kimmel) reveal that corrosive attack of the film stack does occur with some reagents.

Example according to the invention

Using to the same reactive cathode sputter deposition process, panes of float glass were provided with the following sequence:

Glass—$SnO_2$—ZnO:Al:Si—Ag—TiPD—$SnO_2$—ZnO:Al:Si—$ZrO_2$

Table 2 below gives the thicknesses, in nm, of the corresponding films:

TABLE 2

| Glass | Thickness (nm) |
| --- | --- |
| $SnO_2$ | 20 |
| ZnO:Al:Si | 17 |
| Ag | 11 |
| TiPd | 2 |
| $SnO_2$ | 28 |
| ZnO:Al:Si | 8 |
| $ZrO_2$ | 8 |

In the present case, the ZnO:Al:Si-based films were sputtered from targets composed of zinc containing 2% by weight Al and 0.06% by weight Si. The TiPd metallic protective film was sputtered from a target composed of titanium alloyed with 0.2% by weight Pd. The final, $ZrO_2$ film was applied in reactive mode with a "DMS" cathode (double-magnetron sputtering cathode) at a feed rate for the glass to be coated of 6.22 m/min.

Specimens provided with this film stack were subjected to the same tests as in the comparative example. With this film stack according to the invention, the tests yielded the following results:

| Test | A | B | C | D | E | F |
| --- | --- | --- | --- | --- | --- | --- |
| Result | 0 mg/l | 300 h | 1600 passes | 24 h | 32 h | 0% |

The results show that in all the tests, the results obtained with the film stack according to the invention were much better than those obtained with the specimens of the stack according to the invention.

What is claimed is:

1. A transparent substrate provided with a thin-film stack comprising at least one metallic film with reflective properties in the infrared region, and under which is disposed a first antireflection coating comprising one or more metal oxides, and an upper protective metallic film comprising an alloy of Ti, Zr or Hf with Al, Pt or Pd or an AlSi alloy, and a second upper antireflection coating comprising (A) at least two metal oxide films, one of which is ZnO based and contains 0.1 to 10% by weight of at least one of the elements B, Si, Ga, Sn, Al, Co, Mg, Mn, Fe, Ni and/or Cr, and the other comprises $SnO_2$ or $Bi_2O_3$, and (B) a final, hard oxide film.

2. A substrate according to claim 1, wherein the metallic protective film is deposited by cathode sputtering from a metal target composed of titanium alloy with 0.1 to 0.3% by weight Pd.

3. A substrate according to claim 1, wherein the metal oxide film adjacent the metallic protective film is $SnO_2$.

4. A substrate according to claim 1, wherein the metal oxide film adjacent the metallic protective film has a thickness of 20 to 30 nm.

5. A substrate according to claim 1, wherein the final, hard oxide film comprises $TiO_2$, $SiO_2$, $Al_2O_3$ or $ZrO_2$.

6. A substrate according to claim 1, wherein the antireflection coating under the film with reflective properties in the infrared region comprises a $SnO_2$ film and a film comprising ZnO doped with Al and Si wherein the ZnO doped film is adjacent to the film with reflective properties in the infrared region.

7. A substrate according to claim 1, wherein the stack is as follows:

Glass/$SnO_2$/ZnO:Al:Si/Ag/TiPD/$SnO_2$/ZnO:Al:Si/$ZrO_2$.

8. A substrate according to claim 1, wherein the film with reflective properties in the infrared region comprises silver.

9. A low emissivity or antisolar glass incorporating a substrate according to any one of claims 1 to 8.

10. The substrate according to claim 1, wherein the first antireflective layer is the same as the ZnO based layer of the second upper antireflection coating.

11. The substrate of claim 1, wherein the ZnO layer of the second upper antireflection coating is in direct contact with upper protective metal film.

12. The substrate of claim 11, wherein thin films of a mixed oxide with a spinel structure forms at the interface between the ZnO layer and the upper protective metal film.

13. The substrate of claim 1, wherein thin films of a mixed oxide with a spinel structure forms at the interface between the ZnO layer and the upper protective metal film.

14. A transparent substrate provided with a thin-film stack comprising at least one metallic film with reflective properties in the infrared region, and under which is disposed a first antireflection coating comprising one or more metal oxides, and an upper protective metallic film comprising an alloy of Ti, Zr or Hf with Al, Pt or Pd or an AlSi alloy, and a second upper antireflection coating comprising (A) at least two metal oxide films, one of which is ZnO based and contains 0.1 to 10% by weight of Al and Si and the other comprises $SnO_2$ or $Bi_2O_3$, and (B) a final, hard oxide film.

15. A substrate according to claim 14, wherein the metal oxide film of ZnO containing Al and Si is deposited by reactive sputtering from a metal target composed of zinc alloyed with 0.3 to 10% by weight Al and 0.01 to 1% Si.

16. A transparent substrate provided with a thin-film stack comprising at least one metallic film with reflective properties in the infrared region, and under which is disposed a first antireflection coating comprising one or more metal oxides, and an upper protective metallic film comprising an alloy of Ti, Zr or Hf with Al, Pt or Pd or an AlSi alloy, and a second upper antireflection coating comprising (A) at least two metal oxide films, one of which is ZnO based and contains 0.1 to 10% by weight of at least one of the elements selected from the group consisting of Al, Co, Mn, Fe, and Ni in combination with at least one of the elements selected from the group consisting of B, Si, Ga, Sn, Mg, and Cr and the other comprises $SnO_2$ or $Bi_2O_3$, and (B) a final, hard oxide film.

* * * * *